US007001166B2

(12) United States Patent
Hinzpeter et al.

(10) Patent No.: US 7,001,166 B2
(45) Date of Patent: Feb. 21, 2006

(54) ARRANGEMENT OF A DIE-PLATE OF A HYDRAULIC PRESS

(75) Inventors: Jürgen Hinzpeter, Schwarzenbek (DE); Ulrich Zeuschner, Schwarzenbek (DE); Ingo Schmidt, Schwarzenbek (DE); Thomas Pannewitz, Schwarzenbek (DE); Udo Baltruschat, Hamburg (DE); Thorsten Ehrich, Hamburg (DE); Ulf Hauschild, Schwarzenbek (DE)

(73) Assignee: Fette GmbH, Schwarzenbek (DE)

( * ) Notice: Subject to any disclaimer, the term of this patent is extended or adjusted under 35 U.S.C. 154(b) by 255 days.

(21) Appl. No.: 10/274,209

(22) Filed: Oct. 18, 2002

(65) Prior Publication Data

US 2003/0079623 A1 May 1, 2003

(30) Foreign Application Priority Data

Oct. 27, 2001 (DE) ........................... 201 17 609 U

(51) Int. Cl.
*B29C 43/32* (2006.01)

(52) U.S. Cl. .................... 425/78; 425/192 R; 425/193; 425/355; 100/258 A

(58) Field of Classification Search .................. 425/78, 425/352–355, 408, 410–423, 192 R, 193, 425/406; 100/258 A, 269.17
See application file for complete search history.

(56) References Cited

U.S. PATENT DOCUMENTS

| | | | | |
|---|---|---|---|---|
| 4,260,346 A | * | 4/1981 | Anderson et al. | 425/352 |
| 4,347,051 A | * | 8/1982 | DeSantis | 425/78 |
| 4,880,373 A | * | 11/1989 | Balog et al. | 425/149 |
| 5,049,054 A | * | 9/1991 | Schaidl et al. | 425/422 |
| RE35,506 E | * | 5/1997 | Solazzi et al. | 425/149 |
| 6,402,493 B1 | * | 6/2002 | Matsubara et al. | 425/78 |

* cited by examiner

*Primary Examiner*—Robert Davis
*Assistant Examiner*—Thu Khanh T. Nguyen
(74) *Attorney, Agent, or Firm*—Faegre & Benson, LLP

(57) ABSTRACT

An arrangement of a die-plate of a hydraulic press to press powdered material into shape wherein an upper ram and a lower ram interact with a bore of the die-plate wherein the die-plate is supported via vertically arranged supporting standards which, along with upper supporting portions which are cantilevered towards the axis of the die-bore, define upwardly facing bearing areas located close to the die-bore for the die-plate.

15 Claims, 1 Drawing Sheet

ARRANGEMENT OF A DIE-PLATE OF A HYDRAULIC PRESS

CROSS REFERENCE TO RELATED APPLICATION

This application claims priority to German patent application Serial No. 201 17 609.2, filed Oct. 27, 2001.

BACKGROUND OF THE INVENTION

This invention relates to an arrangement of a die-plate of a hydraulic press.

A common procedure to press powdered material into shape is to form the molding space in a die-plate (die-bore) and to produce the compact by means of an upper ram and a lower ram. Usually, the lower ram is moved into the die-bore up to a predetermined position, whereupon filling is done with powdered material. Subsequently, the compact is molded by means of the upper ram. Such a process, for instance helps in pressing metallic powder into shape for the manufacture of molded components according to the sintering technique. In doing so, efforts are made to mould the compact, if possible, already in a relatively precise way with regard to its geometrical dimensions and compactness so as to achieve the desired dimensional stability later, after the sintering process.

If the compact has a geometrical shape in which an oblique surface is provided at the outer surface as is the case, for instance, for cutting blades of milling and drilling tools, a deformation force which is not insignificant is applied to the die-plate. This deformation force causes a deformation of the die-plate by bending and upsetting it.

It is the object of the invention to arrange a die-plate of a hydraulic press in such a way that the deformation of the die-plate by flexural forces becomes minimal.

SUMMARY OF THE INVENTION

In the invention, the die-plate is supported via vertically arranged supporting standards with the supporting standards having upper supporting portions cantilevered at the upper end which define bearing areas for the die-plate close to the die-bore. In this way, the bearing areas may be moved very close to the die-bore so that negligible flexural strains are effected in the remaining portion of the die-plate even if pressing forces are high.

According to an aspect of the invention, the supporting standards, at the lower end, are supported on a flange which, at its underside, is adapted to be fixed to the hydraulic cylinder for the lower ram. As is known the upper and lower rams are operated by hydraulic cylinders.

According to another aspect, the supporting standards are supported on the flange via an intermediate plate.

In a preferred embodiment, one supporting standard each is disposed on opposed sides of the bore axis with two arms disposed at a parallel spacing which at the upper end, have the supporting portions with their bearing areas. Preferably, each arm has a bearing area so that four bearing areas are provided which are preferably disposed at the same circumferential spacing.

According to another aspect of the invention, the cantilevered supporting portions, in turn, are propped by a portion of the supporting standard or supporting arm that gradually widens in an upward direction.

The inventive arrangement of the die-plate can be realized and assembled by simple means.

The invention will be explained in more detail below with reference to an embodiment shown in the drawings.

DETAILED DESCRIPTION

Figure 1:
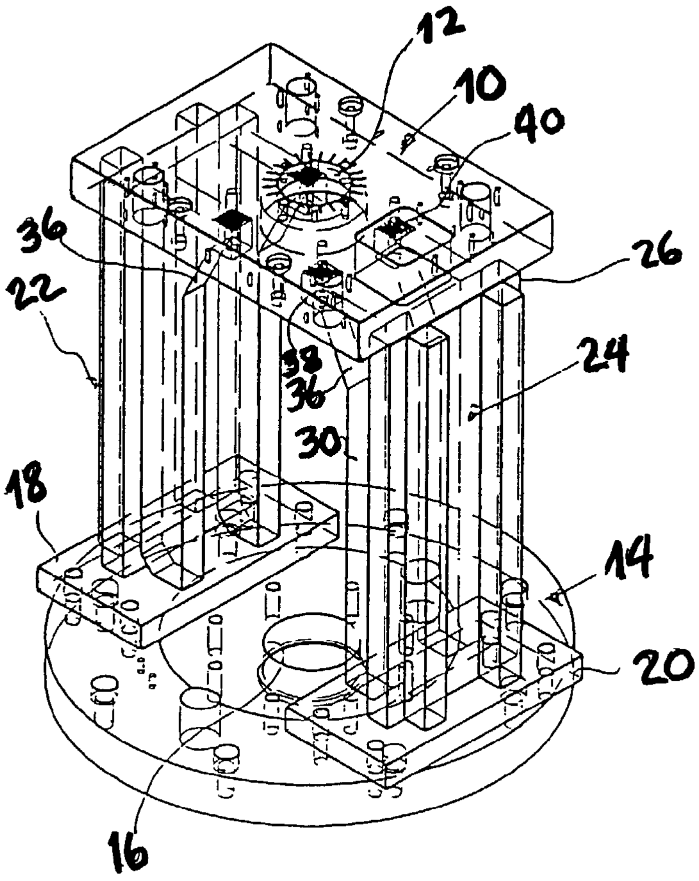
FIG. 1 shows a perspective view of the arrangement of a die-plate according to the invention.
Figure 2:
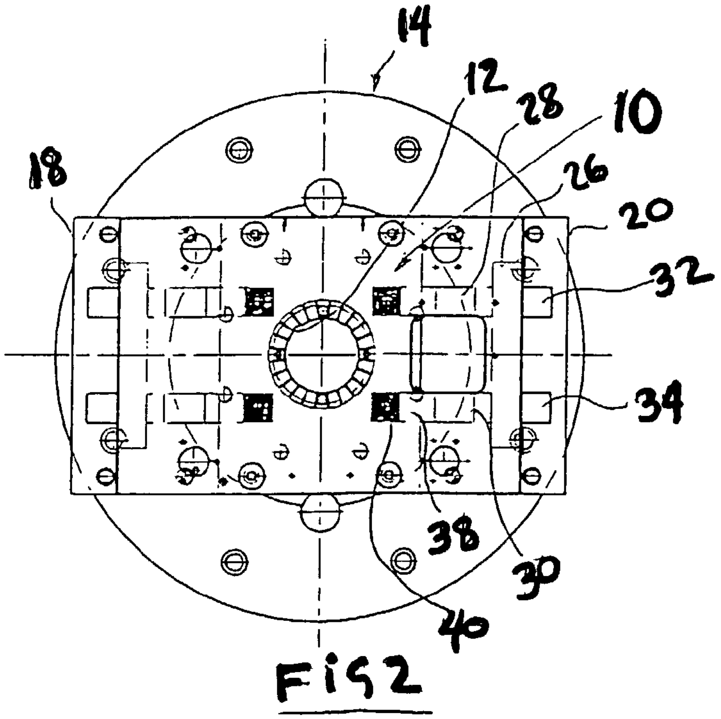
FIG. 2 shows a plan view of the arrangement of FIG. 1.

Referring to FIGS. 1 and 2, a rectangular die-plate 10 can be seen which has a central die-bore 12 for an interaction with an upper ram and a lower ram, neither of which is shown here, as well as the driving devices for the lower and upper rams, i.e. respective hydraulic cylinders.

A flange 14 having a central through bore 16 is disposed below the die-plate 10 at a spacing therefrom and in parallel therewith. The flange 14 is bolted to the cylinder of the lower ram, which action is not shown in detail, however. Opposed sides of the through bore 16, which serves for passing the lower ram therethrough, have mounted thereon intermediate plates 18, 20 on the flange 14. Each intermediate plate 18, 20 has supported thereon a supporting standard 22 and 24, respectively. The supporting standards 22, 24 have an I-profile which is approximately asymmetric, with a vertical cross-web 26 to which two arms 28, 30 are coupled. Webs 32, 34 brace the web 26 and the plate 10 and are formed on the other side of web 26 across from arms 28, 30.

As ensues particularly from FIG. 1 the arms 28, 30 have portions 36 which gradually widen in the upper region and prop inwardly cantilevered supporting portions 38. The supporting portions 38 each have a square bearing area 40 which are completely marked black in FIGS. 1 and 2. They are disposed around the die-bore 12 at uniform circumferential spacings and are provided to be very close to the die-bore. In this way, the die-plate 10 is supported very close to the die-bore 12, the result of which is that flexural forces acting on the die-plate 10 cause no substantial flexural strain of the die-plate 10.

What is claimed is:

1. An arrangement of a die-plate of a hydraulic press to press powdered material into shape wherein an upper ram and a lower ram interact with a die-bore of the die-plate, characterized in that the die-plate (10) is supported via a plurality of vertically arranged supporting standards (22, 24) having upper supporting portions (38) which are cantilevered towards an axis of the die-bore (12) and define upward-facing bearing areas (40) located close to the die-bore (12) of the die-plate (10).

2. The arrangement as claimed in claim 1, characterized in that each of the supporting standards (22, 24) have a lower end supported on a flange (14) adapted to be fixed to a hydraulic cylinder for the lower ram.

3. The arrangement as claimed in claim 2, characterized in that each of the supporting standards (22, 24) are supported on the flange (14) via an intermediate plate (18, 20).

4. The arrangement as claimed in claim 1, characterized in that one supporting standard (22, 24) is disposed on each of a pair of opposed sides of the bore axis with two arms (28, 30) disposed at a parallel spacing which, at the upper end, have the supporting portions (38) with their bearing areas (40).

5. The arrangement as claimed in claim 2, characterized in that one supporting standard (22, 24) is disposed on each of a pair of opposed sides of the bore axis with two arms (28,

30) disposed at a parallel spacing which, at the upper end, have the supporting portions (38) with their bearing areas (40).

6. The arrangement as claimed in claim 3, characterized in that one supporting standard (22, 24) is disposed on each of a pair of opposed sides of the bore axis with two arms (28, 30) disposed at a parallel spacing which, at the upper end, have the supporting portions (38) with their bearing areas (40).

7. The arrangement as claimed in claim 4, characterized in that four bearing areas (40) are provided which are disposed at equal circumferential spacings.

8. The arrangement as claimed in claim 5, characterized in that four bearing areas (40) are provided which are disposed at equal circumferential spacings.

9. The arrangement as claimed in claim 6, characterized in that four bearing areas (40) are provided which are disposed at equal circumferential spacings.

10. The arrangement as claimed in claim 1, characterized in that each of the supporting portions (38) are respectively supported by a portion (36) of the supporting standard (22, 24) or an arm (28, 30) that gradually widens in an upward direction.

11. The arrangement as claimed in claim 2, characterized in that each of the supporting portions (38) are respectively supported by a portion (36) of the supporting standard (22, 24) or an arm (28, 30) that gradually widens in an upward direction.

12. The arrangement as claimed in claim 3, characterized in that each of the supporting portions (38) are respectively supported by a portion (36) of the supporting standard (22, 24) or an arm (28, 30) that gradually widens in an upward direction.

13. The arrangement as claimed in claim 4, characterized in that each of the cantilevered supporting portions (38) are respectively supported by a portion (36) of the supporting standard (22, 24) or the arm (28, 30) that gradually widens in an upward direction.

14. The arrangement as claimed in claim 7, characterized in that each of the supporting portions (38) are respectively supported by a portion (36) of the supporting standard (22, 24) or the arm (28, 30) that gradually widens in an upward direction.

15. A die-plate assembly for use with a hydraulic press to press powdered material into shape, wherein the die-plate assembly is arranged for interaction with a press having an upper hydraulically actuated ram and a lower hydraulically actuated ram, the die-plate assembly comprising a die plate having a die-bore, and the die bore having an axis, the assembly further comprising a plurality of vertically extending supporting standards supporting the die-plate, the standards each having a generally horizontally extending upper supporting portion cantilevered towards the axis of the die-bore and located close to the die-bore of the die-plate, the horizontally extending upper supporting portion defining an upward facing bearing surface in contact with and supporting the die-plate.

* * * * *